(No Model.)
C. W. COSTELLOW.
EGG CARRIER AND HOLDER.
No. 484,876. Patented Oct. 25, 1892.
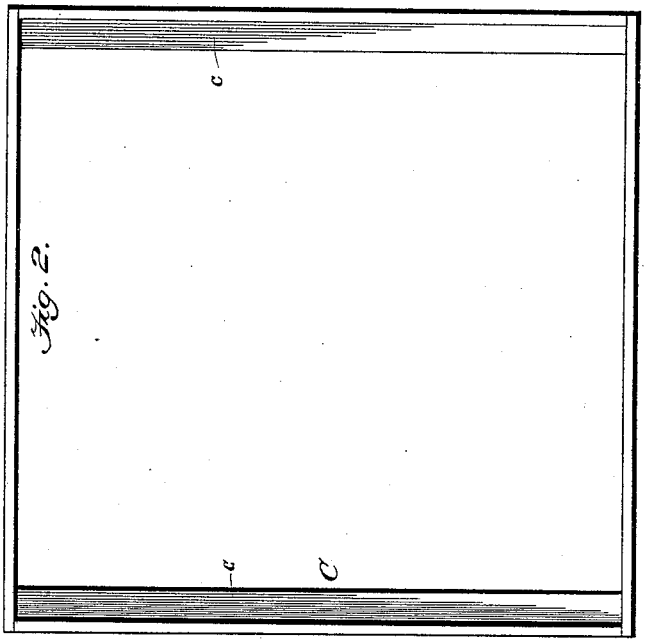
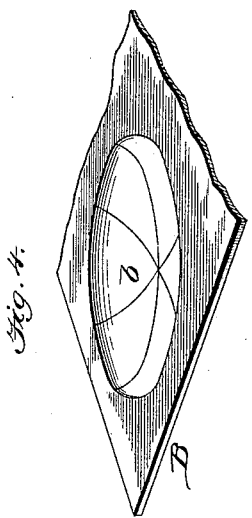
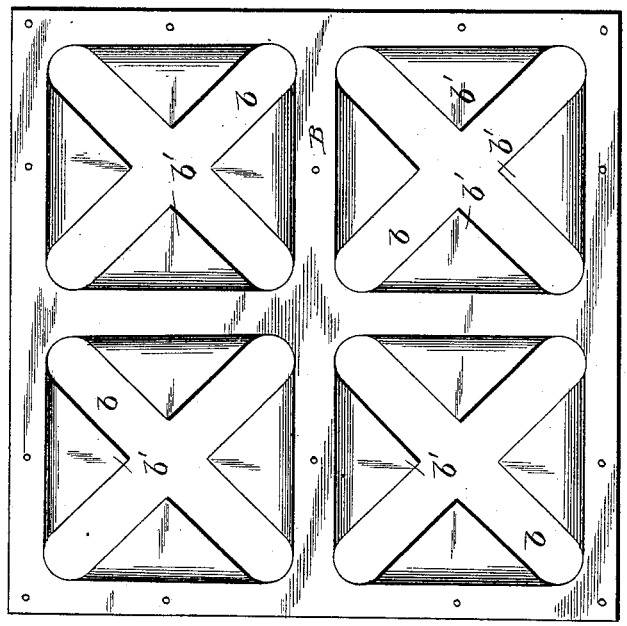
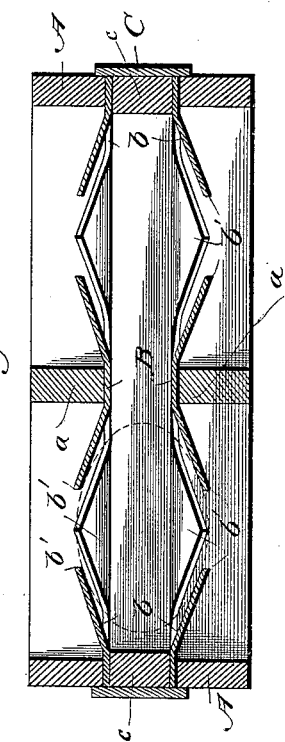
Witnesses:
W. C. Dashiell
William O. Belt
Inventor:
Chas. W. Costellow.
By Edson Bros
Attorneys.

UNITED STATES PATENT OFFICE.

CHARLES WESLEY COSTELLOW, OF WATERBOROUGH, MAINE.

EGG CARRIER AND HOLDER.

SPECIFICATION forming part of Letters Patent No. 484,876, dated October 25, 1892.

Application filed March 2, 1892. Serial No. 423,489. (No model.)

*To all whom it may concern:*

Be it known that I, CHARLES WESLEY COSTELLOW, a citizen of the United States, of Waterborough, in the county of York and State of Maine, have invented certain new and useful Improvements in Egg Carriers or Holders; and I do hereby declare the following to be a full, clear, and exact description of the invention, such as will enable others skilled in the art to which it appertains to make and use the same.

My invention relates to egg carriers or holders, and the object is to provide improved means for holding eggs so that they may be closely packed and shipped without danger of breaking.

Prior to my invention expensive fancy eggs intended for hatching purposes were carefully wrapped in suitable soft materials and each egg was separately packed in a suitable box or inclosure of its own, such precaution being necessary to prevent breaking the eggs from rough handling and usage during transportation and obviate serious loss to the consignee or receiver, because eggs of this kind are quite expensive. By my improvements, however, a large number of eggs can be compactly stored within a series of carriers and they are held or packed in such a manner that they cannot become broken under ordinary usage, such as commonly occurs in transportation.

With these and such other ends in view as pertain to my invention, it consists of two or a series of supporting-frames which are held at suitable distances from each other by intermediate spacing-frames, and within said supporting-frames are secured sheets of strawboard which are provided with a number of intersecting slots or depressions adapted to receive the eggs, which are placed on their sides and are held within the supporting-frames and between the two adjacent sheets by the tongues formed by slotting the sheets.

My invention consists, further, of certain details of construction and arrangement of parts, as will be fully pointed out hereinafter.

I have illustrated the invention in the accompanying drawings, in which—

Figure 1 is a plan view of one of the frames showing the construction of the flexible sheet therein. Fig. 2 is a similar view of a spacing-frame. Fig. 3 is a sectional view showing the frames fitted together in position for use. Fig. 4 is a detail view of one corner of the holder.

Referring to the drawings, in which like letters of reference denote corresponding parts in all the figures, A designates the supporting-frames within which the eggs are placed, and it may be constructed of any desired shape, but is preferably rectangular or square with a transverse brace $a$ at or about its middle. These supporting-frames are arranged in series of any desired number and are maintained at suitable distances apart by spacing-frames, presently described. On one or both faces of each supporting-frame A is secured a sheet of strawboard B or other suitable material, which is fastened by any suitable means to the sides of the frame and to the central brace. These sheets of strawboard are provided with a number of intersecting slots $b$ or depressions. For simplicity I have illustrated the invention by showing only four of the intersecting slots arranged equally on both sides of the brace $a$, which serves to support the middle of the holder; but it is obvious that any number of intersecting slots and braces may be used as may be found desirable without departing from the scope of my invention. The projections $b'$, formed by these intersecting slots, are depressed slightly at their proximate inner portions and constitute a flexible bed for the eggs, which are placed on their sides in said beds. The sheets of strawboard on each frame are cut substantially alike, so that the interserting slots in the series of sheets will be in vertical alignment with each other, and the eggs are placed between said sheets so that they cannot become displaced. It will be observed that the spacing-frame brings the frames A so close to one another that an egg of ordinary size cannot be placed between the sheets B, except in the beds formed by the intersecting slots, and these slots and the flexible projections $b'$ formed thereby will permit an egg to adjust itself to the holder by forcing the projections down a sufficient distance to bring its side below the plane of the sheet of strawboard. Thus a number of eggs of different sizes may be packed in the holder side by side without danger of the smaller eggs getting displaced, because the pointed projections $b'$ will give sufficiently to receive the larger eggs so that all will be held firmly in place.

By packing the eggs on their sides instead of on end I am able to effect great economy in the space required to pack a given number of eggs, and the flexible projections prevent the eggs from jarring, jolting, and becoming broken. The eggs may also be packed in series, one above the other, and the strawboards cut exactly alike, instead of arranging the same to bring the eggs on each alternate holder in alignment.

The spacing-frames C are constructed substantially like the frames A, but a little larger to receive within themselves the edges of the holding-frames, and said spacing-frames have two or more strips $c$ secured on the inside thereof to arrest the inward adjustment or movement of the frames A. These stops or strips are of such size that the frames will be brought close enough together to hold the small eggs tightly, and the large eggs will adjust themselves in the beds, so that all the eggs will be securely held in place.

It is quite common to pack eggs for shipment in cases on end; but by placing them on their sides in the manner above described there is no danger of the smaller eggs pushing through the openings or the larger eggs fitting unevenly in their beds. These cases, as stated, are intended to be used principally for shipping valuable eggs for hatching purposes; but they may be used with equal efficiency for ordinary shipping purposes.

By packing the eggs and holding them in place by compression of the strawboard in the manner described there is no liability of the eggs breaking and they cannot come in contact with each other.

I am aware that changes in the form and proportion of parts and details of construction of my invention may be made without parting from the spirit or sacrificing the advantages thereof, and I therefore reserve the right to make such changes as fairly fall within the scope of the same.

Having thus fully described my invention, what I claim as new, and desire to secure by Letters Patent, is—

1. In an egg-carrier, the frames A, the sheets B, secured thereon and having a series of intersecting slots forming the series of projections, and the spacing-frame having the side strips $c$, adapted to receive the holding-frames and keep them at a suitable distance from each other, substantially as described.

2. In an egg-carrier, the combination of a spacing-frame, the two holding-frames adapted to be held a suitable distance apart by said spacing-frame and having the sheets B, extending entirely across the holding-frames and provided with the projections $b'$, arranged in vertical alignment to form pliable beds adapted to receive the eggs, substantially as described.

3. In an egg-carrier, the combination of the holding-frame A, the spacing-frame C, having side strips $c$ to receive the holding-frames and space them apart, the spacing-frame inclosing the adjacent edges of the holding-frames to prevent their displacement, and the sheets B, secured to the face of the holding-frames, which rest against the side strips of the spacing-frame, said sheets having the series of intersecting slots $b$, forming projections $b'$, which are bent to provide an elastic bed for the eggs, substantially as described.

In testimony whereof I affix my signature in presence of two witnesses.

CHARLES WESLEY COSTELLOW.

Witnesses:
C. W. SMITH,
GEORGE W. CARLL.